United States Patent Office

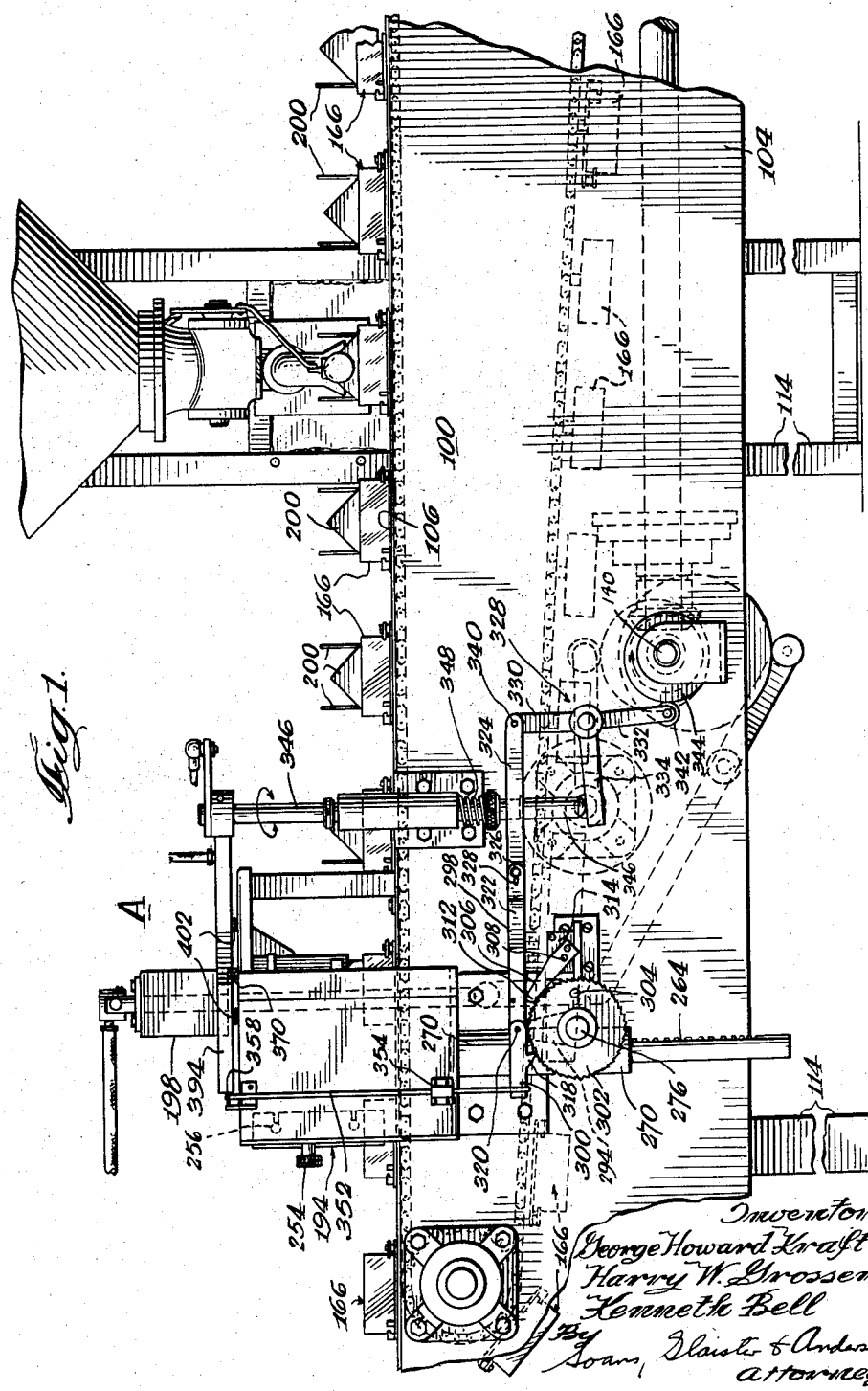

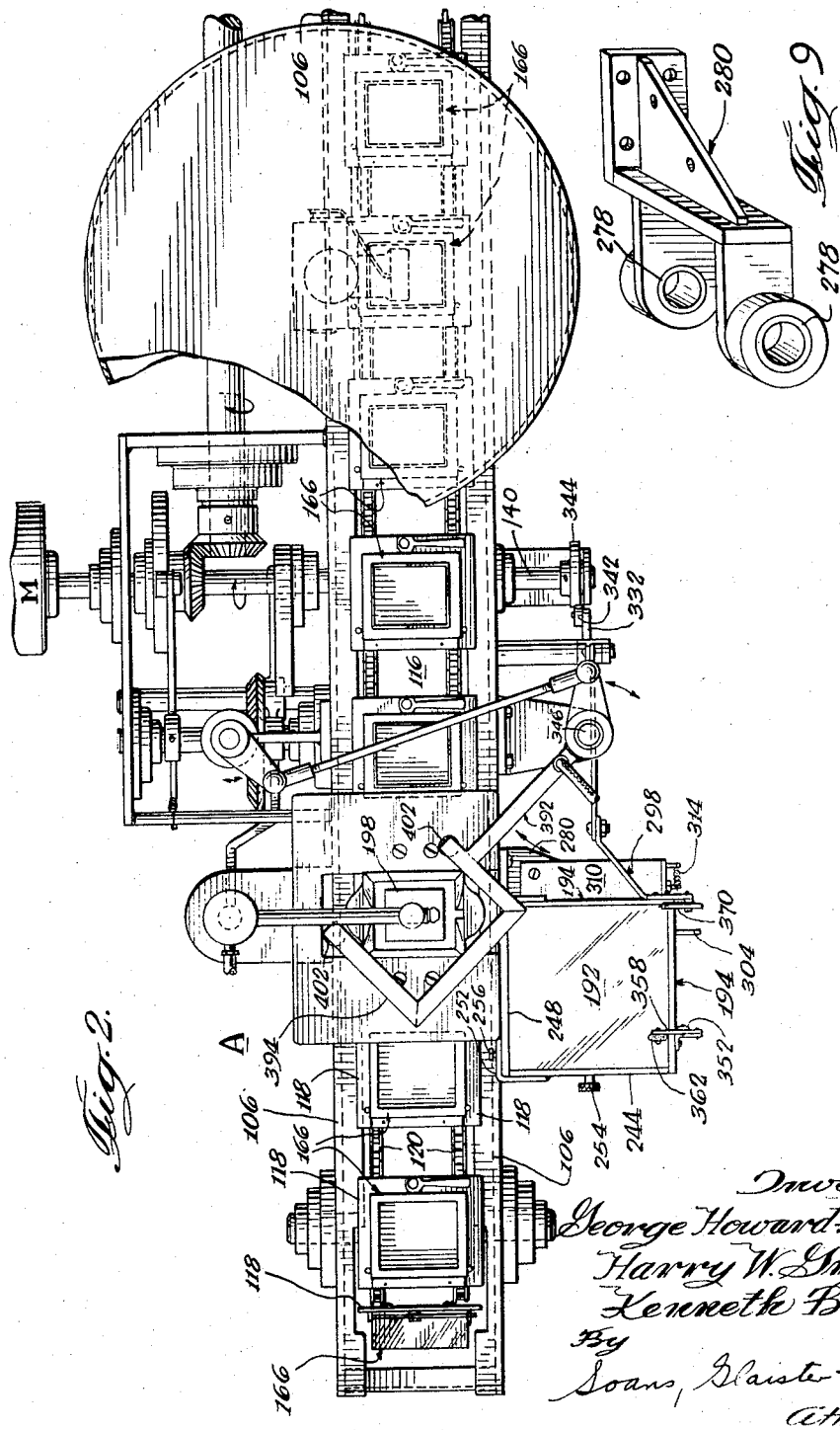

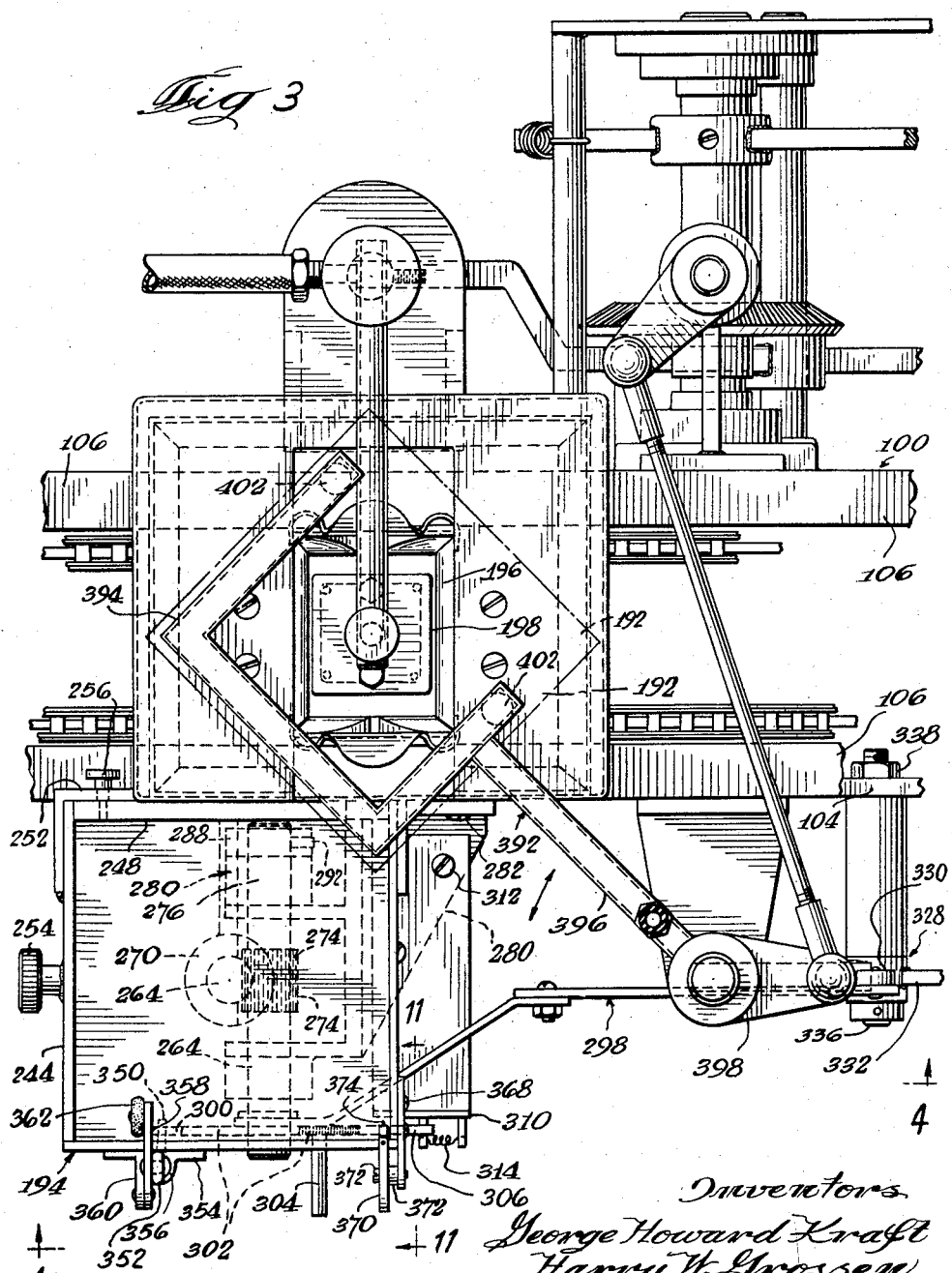

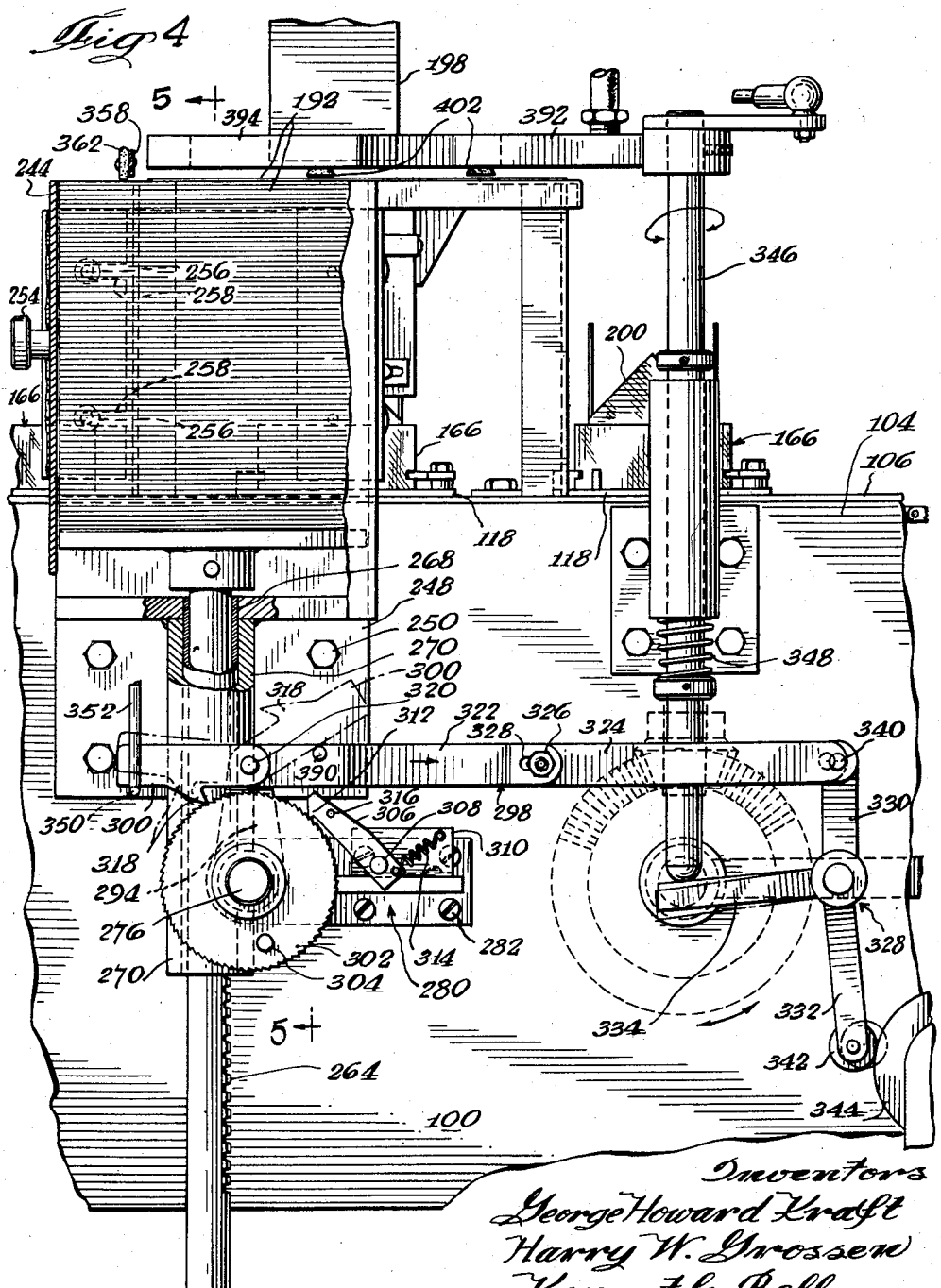

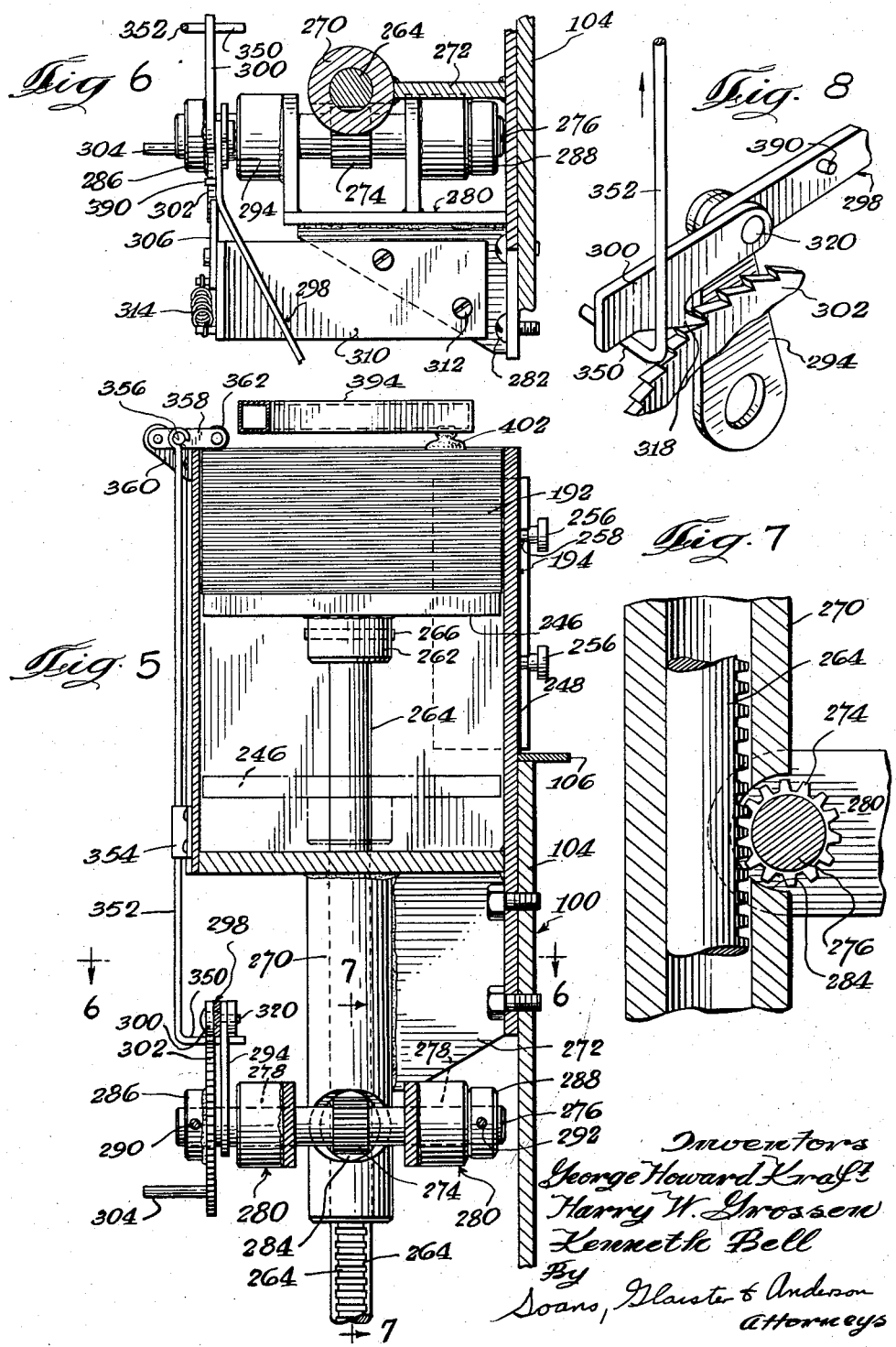

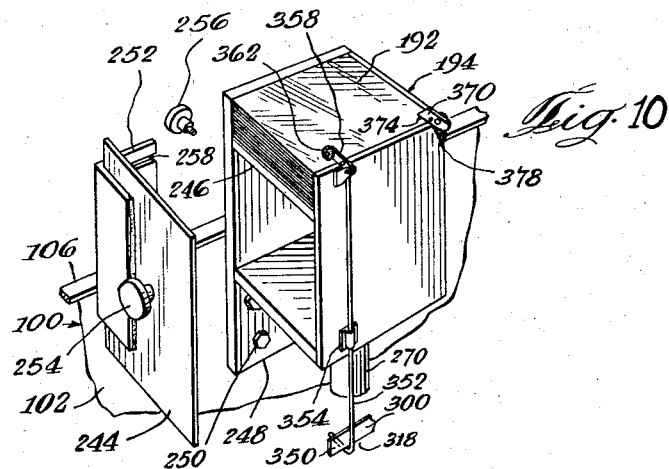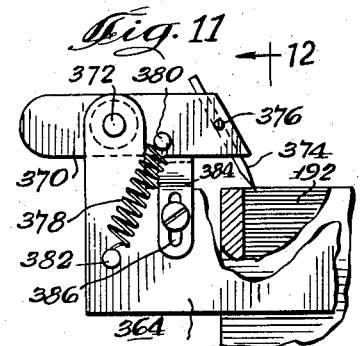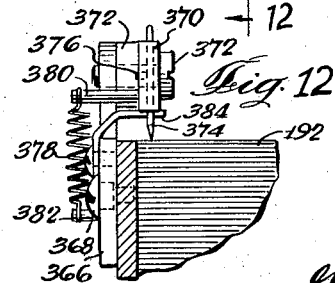

2,869,868
Patented Jan. 20, 1959

2,869,868

WRAPPER FEED MECHANISM

George Howard Kraft, Wilmette, Harry W. Grossen, Chicago, and Kenneth Bell, Marengo, Ill., assignors to National Dairy Products Corporation, a corporation of Delaware Original application June 19, 1951, Serial No. 232,366, now Patent No. 2,790,287, dated April 30, 1957. Divided and this application May 3, 1954, Serial No. 432,713

6 Claims. (Cl. 271—31)

The present invention, in general, relates to a wrapper feed mechanism, and in particular to a means for storing a stack of wrappers and feeding the wrappers one-by-one into an automatic packaging machine. This patent is a division of Patent No. 2,790,287 which is assigned to the assignee of this invention.

The present invention may be used with any automatic packaging machine, but is particularly adapted to be used with a packaging machine for packaging cream cheese which is in a heated, flowable state. Patent No. 2,790,287, describes a packaging machine which may be used to package cream cheese.

An object of the present invention is to provide a means for storing a stack of wrappers and feeding the wrappers one by one into a packaging machine which is automatic in operation and which is adapted to package materials in foil or like wrappers. Another object of the present invention is to provide a wrapper feed mechanism which is simple and economical to manufacture.

Other objects and advantages of the invention will be apparent from the following description and accompanying drawings.

In the drawings:

Figure 1 is a front elevational view of one embodiment of a wrapper feed mechanism in accordance with the present invention forming a part of an automatic packaging machine of the type described in Patent No. 2,790,287, only a portion of the machine being illustrated;

Figure 2 is a plan view of the wrapper feed mechanism and packaging machine portion shown in Figure 1;

Figure 3 is an enlarged plan view of the wrapper feed mechanism shown in Figures 1 and 2;

Figure 4 is a fragmentary, elevational view taken along line 4—4 of Figure 3;

Figure 5 is a sectional view taken along line 5—5 of Figure 4;

Figure 6 is a sectional view taken along line 6—6 of Figure 5;

Figure 7 is a sectional view taken along line 7—7 of Figure 5 showing the rack and pinion mechanism associated with the wrapper feed mechanism;

Figure 8 is a perspective view of the ratchet-pawl drive associated with the wrapper feed mechanism;

Figure 9 is a perspective view of the ratchet-pinion supporting bracket;

Figure 10 is a perspective view of the wrapper feed mechanism housing with a side panel separated from the housing;

Figure 11 is a fragmentary, sectional view of the needle hold-down mechanism which constitutes a part of the wrapper feed mechanism taken generally along line 11—11 of Figure 3; and Figure 12 is a sectional view taken along line 12—12 of Figure 11.

Referring to the drawings, the portion of the packaging machine illustrated in Figures 1 and 2 includes a main frame 100 which supports all of the operating elements of the packaging machine. The frame 100 includes longitudinally extending, vertically-disposed plates 102 and 104, a narrow, horizontally extending top plate 106 attached to each end of the plates 102 and 104 by suitable means such as screws 108, a plurality of transverse cross members 110 extending between the side plates adjacent their upper end and attached thereto by suitable means such as screws 112, and vertical legs 114 which are suitably attached to the side plates by welding or the like.

An endless conveyor 116 which moves around a closed path on the frame 100 carries spaced-apart conveyor plates 118 to a consecutive series of operating stations on the machine. The power for driving the conveyor 116 and the other operating mechanisms in the packaging machine is derived from the motor "M" through a suitable power transmission means.

The rigid open-topped, rectangular container 166 is releasably secured to the upper surface of each of the conveyor plates 118. The containers 166 are proportioned so that their inside dimensions correspond to the outer dimensions which one desires in the final package.

In the operation of the packaging machine, the conveyor 116 carries the containers 166 to the various operating stations of the packaging machine where the steps of the packaging process are carried through. The wrapper feeding mechanism in the illustrated embodiment is applied to the first station of the packaging machine. This station, which is called the wrapper transfer and forming station, is described briefly below. The action of the various operating stations of the packaging machine on a flexible wrapper 192 is described more fully in Patent No. 2,790,287.

The conveyor first carries an empty container 166 to a wrapper transfer and forming station where the flat, rectangular-shaped wrapper 192 is transferred from a wrapper magazine 194, constructed in accordance with the present invention, to the upper surface of the appropriately designed forming die 196. A forming block 198 then descends on the wrapper 192 forcing the wrapper through the die 196 into the container 166. As the wrapper moves through the forming die 196, it is transformed into the form of an open receptacle 200.

The wrapper feeding mechanism includes an open-topped magazine housing 194 having a removable side panel 244, a vertically-slidable, horizontally-disposed platform 246 within the housing 194, a drive means for moving the platform within the housing, a means for preventing the platform from rising within the housing when the flexible wrappers 192 extend to the top of the magazine housing 194, and a hold-down means which prevents more than one wrapper 192 from being removed from the top of the magazine housing 194 during a single cycle of the transfer mechanism.

The magazine housing 194 is proportioned to hold a stack of flexible wrappers 192 and includes a back plate 248 which is attached to the frame of the packaging machine, as by bolts 250. A removable side panel 244 having a side flange 252 and an outwardly extending, knurled handle 254 is adapted to be attached to the magazine housing 194 by a removable screw 256 which extends through a slot 258 in the side flange 252 and into the back plate 248 of the magazine housing 194.

The vertically-movable platform 246 positioned within the interior of the magazine housing 194 has a collar 262 center on its bottom and fixedly attached thereto. A vertically extending rack 264 which is rigidly connected to the collar 262 by a pin 266 extends downwardly through the base of the magazine housing 194 and through a downwardly extending bearing member 268 within a vertically-disposed cylindrical sleeve 270. The sleeve 270 is connected to a supporting bracket 272 which is fixedly attached to the magazine housing 194.

The vertical movement of the platform 246 is controlled by a pinion 274 which engages the vertically extending rack 264. The pinion 274 is fixedly positioned on a shaft 276 which is journalled in bearings 278 which are located within the arms of a supporting bracket 280. The bracket 280, which is illustrated in Fig. 9, is fixed to the packaging machine frame 100 by screws 282. The vertical sleeve 270 and the bearing member 268 are appropriately cut away at 284 so as to permit the pinion 274 to engage the rack 264. Two collars 286 and 288 which are secured to the shaft 276, as by the screws 290 and 292, keep the pinion 274 in engagement with the rack 264.

An upstanding supporting link 294 which is rotatably journalled on the shaft 276 acts as a support for one end of an adjustable, horizontally extending link 298 and for an arm 300. The shaft 276 also extends through a ratchet wheel 302 which is fixedly attached to the inner end of the collar 286. An outwardly extending rod 304 is attached to the face of the ratchet wheel 302 for manually rotating the ratchet wheel 302. The movable platform 246 is normally prevented from moving downward by a holding dog 306 which engages the ratchet wheel 302. The holding dog 306 is pivoted about a pin 308 which is attached to an L-shaped supporting bracket 310. As seen in Fig. 3, the supporting bracket 310 is attached by screws 312 to the bracket 280. The forward end of the holding dog 306 includes a pawl 312 which is adapted to engage the ratchet wheel 302 so as to permit the ratchet wheel 302 and the shaft 276 to rotate in one direction only. The pawl 312 of the holding dog 306 is normally biased towards the ratchet wheel 302 by a spring 314 which is attached to pins on the rearward end of the holding dog 306 and on the bracket 310. When it is desired to lower the movable platform 246, the holding dog 306 can be rotated so as to lift the pawl 312 out of engagement with the ratchet wheel 302. A pin 316 which extends outwardly from the forward face of the holding dog 306 provides a convenient means for manually rotating the holding dog 306.

Under certain conditions, i. e. when the wrapper foils fall a given distance below the top of the magazine housing 194, the ratchet wheel 302 is also engageable by a pawl 318 on the arm 300. The arm 300 is rotatably journalled on a pin 320 which extends through the supporting link 294 and one end of the adjustable link 298. The link 298 is constructed of two members 322 and 324 connected together by a nut and screw 326. A slot 328 is provided in the member 322 for adjusting the horizontal length of the link 298.

A collar member 328 containing three outwardly extending arms 330, 332, and 334 which are at right angles to each other is rotatably supported on a rod 336 which is attached to the main frame 100 by a nut and washer assembly 338 (see Fig. 3). The end of the arm 330 extends upwardly and is rotatably connected adjacent its end to the link 298 by a pin 340. The arm 332 extends downwardly and rotatably supports a cam roller 342 adjacent its end, which roller is adapted to engage a cam 344 on the shaft 140. The arm 334 extends horizontally below a rotatable shaft 346. A spring 348 on the shaft 346 biases the shaft against the arm 334 so as to retain the cam roller 342 in contact with the cam 344. In operation, the rotating cam 344 imparts an oscillating motion to the collar member 328, which motion is transmitted through the arm 330 to the link 298, thereby imparting a back-and-forth movement to the arm 330 and the pawl 318.

The pawl 318 on the arm 300 is held out of engagement with the ratchet wheel 302 by a hook 350 which engages and lifts the arm 300 unless the foil wrappers 192 fall a given distance below the top of the magazine housing 194. The hook 350 is integral with a rod 352 which is slidable in a bracket 354 connected to the forward face of the wrapper magazine housing 194 and which is connected at its upper end to a pin 356 on an arm 358. The arm 358 is pivoted at its outer end to a bracket 360 attached to the forward face of the magazine housing 194. A roller 362 is rotatably connected to the inner end of the arm 358 which extends over the surface of the foil wrappers 192 which lie within the magazine housing 194. As seen in Fig. 5, the roller 362 rests on the surface of the wrappers 192, thereby controlling the position of the arm 358 and the rod 352. As the wrappers 192 are removed from the magazine housing 194 the roller 362 moves downwardly causing the arm 358 and the hook 350 to descend, thereby lowering the reciprocating arm 300 which carries the pawl 318. Eventually, the pawl 318 will engage the teeth of the ratchet wheel 302 and will then rotate the ratchet wheel 302 clockwise one notch, thereby raising the platform 246 and the wrappers 192. As the wrappers 192 are raised the roller 362 will move upwardly, thereby causing the hook 350 to rise, and the arm 300 will therefore again move upwardly, moving the pawl 318 out of engagement with the ratchet wheel 302.

In order to assure that only one wrapper 192 is removed from the wrapper magazine 194 during each cycle of the transfer mechanism, a hold-down mechanism 364 is attached to the top of the wrapper magazine 194, as shown in Figs. 3, 10, 11 and 12. The hold-down mechanism 364 includes an L-shaped bracket 366 which is attached to the right side of the magazine housing 194 adjacent the forward and top edge thereof by screws 368. The bracket 366 extends forwardly and upwardly of the magazine housing 194, as seen in Fig. 11. An arm 370 is pivoted on the screw 372 threaded to the top of the bracket 366 and extends over the edge of the magazine housing 194. The arm 370 is separated from the bracket 366 by a bearing collar 372. A downwardly-inclined needle 374 is fixedly positioned within the inner end of the arm 370 by the set screw 376. The arm 370 is biased by a spring 378 which is attached at its upper end to a pin 380 on the arm 370, and at its lower end to a pin 382 on the bracket 366 so that the point of the needle 374 extends within the wrapper magazine housing 194. An adjustable stop 384 having a slot 386 is connected to the bracket 366 by a screw 388. The upper end of the stop 384 is bent so as to extend beneath the arm 370 to prevent the arm 370 from extending below a fixed point. The stop 384 is positioned so that the needle 374 contacts the surface of the uppermost foil wrapper 192 with a sufficient downward force so as to penetrate the face of the uppermost wrapper 192 to be taken from the magazine housing 194, which will prevent the second wrapper from being removed from the magazine housing 194. To operate effectively, the point of the needle 374 must be sufficiently sharp so as to make a small slit in the uppermost wrapper when that sheet is removed from the magazine housing 194 but must not penetrate through the second wrapper.

To insert wrappers 192 within the magazine housing 194, one must first remove the side panel 244, rotate the arm 300 around the pin 320 until the back of the arm 300 rests on a pin support 390 on the link 298, and lift the holding dog 306 from the ratchet wheel 302. After the two pawls 312 and 318 are disengaged from the ratchet wheel 302, the weight of the platform 246 will generally cause the platform 246 to drop, or one can rotate the ratchet wheel 302 by means of the outwardly extending rod 304 so as to lower the platform 246 at a slower speed than generally results when it is allowed to fall under its own weight. When the holding dog 306 is released, it will again engage the ratchet wheel 302 so as to prevent a further downward movement of the movable platform 246. The wrappers 192 can then be inserted in the magazine housing 194 on the upper surface of the platform 246. After the wrappers 192 are placed in the magazine housing 194, the removable panel 244 is again placed in position in the side of the magazine housing 194, and the arm 300 is rotated back to its original position. As the wrappers 192 are below the top of the magazine housing 194, the removable platform of can be manually raised by rotating the ratchet wheel 302 in a clockwise direction by the rod 304.

Any suitable means may be used to feed the wrappers one by one from the top of the magazine. One means which may be used is the wrapper transfer mechanism described fully in Patent No. 2,790,287, which is especially adapted to remove a single wrapper from the wrapper magazine 194 and to position the wrapper 192 on the forming die 196. The transfer mechanism includes a transfer arm 392 consisting of a U-shaped head section 394 and an extending arm section 396, and a means for moving the transfer arm 392 between the wrapper magazine 194 and the forming die 196. The head section 394 is proportioned to extend within the boundaries of the wrapper 192 adjacent three sides thereof. The head section 394 and the arm section 396 have inner communicating passageways which are adapted to be intermittently maintained under vacuum. A resilient suction cup 402 is connected to the lower side of the head section 394 adjacent the free end of each of the legs of the head section 394. The suction cups 402 each have a passageway which communicates with the passageway in the interior of the head section 394.

In operation, the transfer arm 392 is initially adjacent the upper surface of one of the wrappers 192 in the wrapper magazine 194, and grips the wrapper 192 with the head of the suction cup 402. The passageway in the transfer arm 392 is then connected to a source of vacuum, and the transfer arm 392 is then raised slightly in a vertical direction by suitable linkages and rotated so as to position the head section 394 intermediate the forming block 198 and the forming head 196. The transfer arm 392 is next lowered by the downward movement of suitable linkages so that the wrapper 192 rests on the upper surface of the forming die 196. The vacuum on the suction cup is then released, thus releasing the hold on the wrapper 192. The transfer arm 392 is then raised and returned to its previous position above the magazine housing 194 where it is again lowered until the suction cups 402 are again in contact with the surface of a wrapper 192 within the wrapper magazine 194, and the cycle is then repeated.

The described wrapper feed mechanism may be varied considerably with respect to many of its structural details and operating mechanisms. Hence, the scope of the invention as defined by the claims should not be limited to specific details in arrangements herein disclosed but should be interpreted as broadly as is consistent with the state of the prior art.

We claim:

1. In a packaging machine of the class described, a housing for guiding a stack of wrappers, means for feeding wrappers one by one from the top of a wrapper stack in said housing, a platform vertically movable within said housing for vertically movably supporting a stack of wrappers in said housing, a rotatably mounted ratchet wheel, connections between said ratchet wheel and said platform whereby rotation of said ratchet wheel in one direction will effect upward movement of said platform, a pawl normally engaging said ratchet wheel to prevent rotation of said ratchet wheel in the other direction, whereby said platform is normally held against downward movement, a second pawl for engaging and rotating said ratchet wheel in platform elevating direction, and means engageable with the top of a stack of blanks on said platform and connected to said second pawl to cause operative engagement of said second pawl with said ratchet wheel only when the top of the stack of blanks is lowered to a predetermined level by the successive removal of blanks from the stack by said feeding means.

2. In a packaging machine of the class described having means for storing a stack of flat, flexible wrappers and for feeding said wrappers one by one from the top of such stack, a generally vertically extending, open-topped housing, a vertically movable platform within said housing for vertically movably supporting the stack of wrappers in said housing, means for effecting upward movement of said platform and wrapper stack to position the top of the stack substantially at a predetermined elevation, said means comprising a driving element which is normally reciprocated through a path of travel which is of the length required to impart a predetermined increment of upward movement to said platform, a feeler which engages the top of said wrapper stack, and means interconnecting said feeler and driving element and operative to hold said driving element in an inoperative position during its reciprocation as aforesaid until the top of the wrapper stack falls to a predetermined, lowered elevation as an incident to the removal of a plurality of wrappers from the top of said stack.

3. In a packaging machine of the class described having means for storing a stack of flat, flexible wrappers and for feeding said wrappers one by one from the top of such stack, a generally vertically extending, open-topped housing, a horizontal platform mounted for vertical movement within said housing, said housing being proportioned so as to vertically slidably contain said stack of wrappers on said platform, means for moving said platform and wrapper stack upwardly within said housing, and means constantly in engagement with the top of said stack of wrappers and operatively connected to said platform and stack moving means to control the operativeness thereof so that upward movement of said platform and stack is effected only at intervals when the elevation of the top of said stack is lowered to a predetermined level as an incident to the feeding of a plurality of wrappers from the top of the stack.

4. In a packaging machine of the class described having means for storing a stack of flat, flexible wrappers and for feeding said wrappers one by one from the top of such stack, a generally vertically extending, open-topped housing, a vertically movable platform within said housing for vertically movably supporting the stack of wrappers in said housing, a vertically slidably mounted rack depending from said platform, a rotatably mounted pinion in operative engagement with said rack for moving said rack and said platform vertically, a ratchet wheel rigidly connected to said pinion, a pawl releasably engaged with said ratchet wheel to hold the same against platform-lowering rotation, cam operated means for moving said platform upwardly to position the top of said stack at a predetermined elevation, said cam operated means comprising a reciprocating arm, a pawl carried by said arm and adapted to engage said ratchet wheel for rotating the same to move said platform upwardly, a feeler which engages the top of said wrapper stack, and means interconnecting said feeler and said last-mentioned pawl to hold the latter out of operative engagement with said ratchet wheel until the top of said wrapper stack falls to a predetermined lowered elevation as an incident to the removal of a plurality of wrappers from the top of such stack.

5. In a packaging machine of the class described having means for storing a stack of flat, flexible wrappers and for feeding said wrappers one by one from the top of such stack, a generally vertically extending, open-topped housing having a base, a removable side panel providing access to the interior of said housing to facilitate loading therof, and a vertically movable platform within said housing for vertically movably supporting the stack of wrappers in said housing, a rack depending from said platform and slidably vertically through the base of said housing, a rotatably mounted pinion in operative engagement with said rack for moving said rack and said platform vertically, a ratchet wheel rigidly connected to said pinion, a pawl releasably engaged with said ratchet wheel to hold the same against platform-lowering rotation, cam operated means for moving said platform upwardly to position the top of said stack at a predetermined elevation, said cam operated means comprising a reciprocating arm, a pawl carried by said arm and normally yieldingly urged into engagement with said ratchet wheel for rotating the same to move said platform upwardly, a feeler which engages the top of said wrapper stack, and a rod operatively interconnecting said feeler and said last-mentioned pawl to hold the latter out of engagement with said ratchet wheel until the top of said wrapper stack falls to a predetermined lowered elevation as an incident to the removal of a plurality of wrappers from the top of said stack.

6. In a packaging machine of the class described, a generally vertically extending, open-topped housing for storing a stack of flat, flexible wrappers, a horizontal platform mounted for vertical movement in said housing for vertically movably supporting the wrapper stack in said housing, means for moving said platform and wrapper stack upwardly within said housing to adjust the top of said stack to a predetermined elevation, means for gripping the wrapper on the top of said stack and removing said top wrapper edgewise from said stack, and holding means for preventing more than one wrapper from being removed at one time, said holding means comprising a needle which engages said top wrapper, said needle having its wrapper engaging end sharpened and being biased to cause said needle to at least partially penetrate the engaged wrapper and form a slit therein incident to said edgewise removal of said wrapper.

References Cited in the file of this patent

UNITED STATES PATENTS

| | | |
|---|---|---|
| 534,407 | Redington et al. | Feb. 19, 1895 |
| 583,376 | Hoppe | May 25, 1897 |
| 667,062 | Combs | June 25, 1901 |
| 930,702 | Sprowles et al. | Aug. 10, 1909 |
| 1,578,822 | Glover | Mar. 30, 1926 |
| 1,976,893 | Shomaker | Oct. 16, 1934 |
| 2,033,849 | Mudd | Mar. 10, 1936 |
| 2,293,046 | Curtis | Aug. 18, 1942 |
| 2,358,560 | Curtis | Sept. 19, 1944 |
| 2,568,069 | Herr | Sept. 18, 1951 |
| 2,639,917 | Macey | May 26, 1953 |